Jan. 11, 1949.  G. H. GLOSS  2,458,847
PROCESS FOR MANUFACTURE OF MAGNESIUM PRODUCTS
Filed May 10, 1943  2 Sheets-Sheet 1

INVENTOR.
Gunter H. Gloss
BY
ATTORNEY.

Jan. 11, 1949.  G. H. GLOSS  2,458,847
PROCESS FOR MANUFACTURE OF MAGNESIUM PRODUCTS
Filed May 10, 1943  2 Sheets-Sheet 2
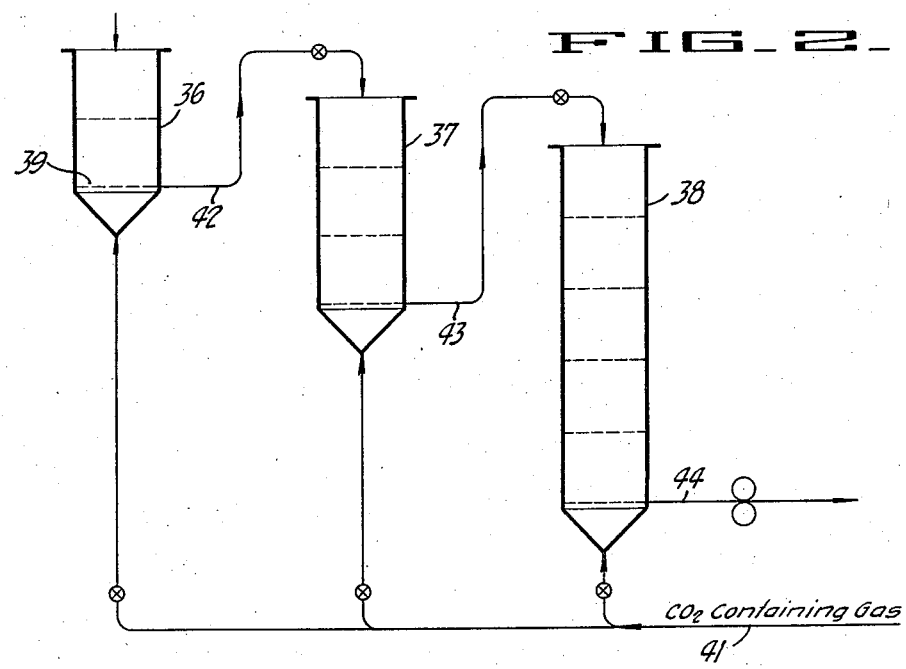
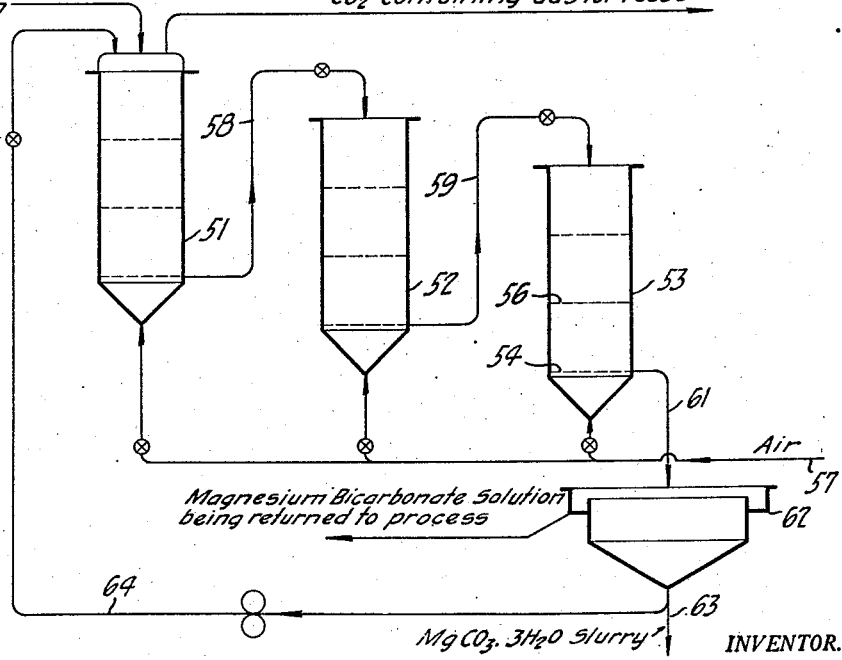
INVENTOR.
Gunter H. Gloss
BY
Paul D. Flehr
ATTORNEY Patented Jan. 11, 1949

2,458,847

UNITED STATES PATENT OFFICE 2,458,847

PROCESS FOR MANUFACTURE OF MAGNESIUM PRODUCTS

Gunter H. Gloss, Redwood City, Calif., assignor to Marine Magnesium Products Corporation, South San Francisco, Calif., a corporation of Delaware Application May 10, 1943, Serial No. 486,391

4 Claims. (Cl. 23—67)

This invention relates generally to processes for the manufacture of magnesium products, from brines such as sea water, concentrated inland brines, or synthetic brines, which contain convertible magnesium salts, like magnesium chloride.

In the manufacture of magnesium products from brines it has been common practice where comparatively pure products are desired, to first subject the brine to extensive pretreatment for the purpose of producing a purified brine which is free from solid phase and organic impurities, and from dissolved calcium bicarbonate. This treatment generally involves chlorinating the brine, settling out the more readily removable solid impurities, reacting the brine with a limited amount of lime, and then removing further solid phase impurities by settlement and filtration. Reaction with lime during pretreatment serves to precipitate dissolved calcium bicarbonate as solid phase calcium carbonate. This reaction may be accompanied by precipitation of from say 5 to 10% of the convertible magnesium salts present, depending upon the amount of lime used. Pretreatment of this type is disclosed in Chesny Patent No. 2,089,339 as applied to sea water, and Chesny et al. 2,041,047, as applied to a concentrated inland brine. Clarke 2,276,245 discloses recirculation of sludge solids during pretreatment, to expedite removal of dissolved calcium bicarbonate.

After the brine has been purified by pretreatment as described above, it is conventional practice to react it with lime or calcined dolomite, whereby magnesium hydroxide is precipitated. The precipitated magnesium hydroxide is withdrawn as a slurry from the lower end of the main precipitating tank, after which it is thickened, and then subjected to washing for the purpose of removing dissolved impurities, such as sodium chloride and dissolved calcium salts. Where the slurry is comparatively viscous it can be washed by the method disclosed in Farnsworth 2,019,488, in which flocs or filaments of the slurry are caused to progress downwardly through an upwardly moving column of wash water. Less viscous slurries can be treated in a series of washing operations involving dilution with wash water, settling, and decantation of effluent from the thickened slurry, or if the precipitate is highly crystalline it can be subjected to conventional filtration, with washing of the filter cake. Irrespective of the method employed to remove soluble impurities, the resulting magnesium hydroxide is then subjected to further treatment to convert it into various products. For example it can be calcined to form a magnesium oxide, or it may be carbonated to form basic magnesium carbonate.

In the procedure outlined above the removal of impurities requires two distinct steps, namely a pretreatment to remove solid phase impurities, and washing after precipitation to remove dissolved impurities. Both operations are somewhat involved and add materially to the expense of forming the desired final products. The tanks and other equipment required involve a comparatively large capital expenditure for a given capacity. A further characteristic of such processes is that the final product is contaminated by solid phase impurities which may be contained in the precipitant employed, and considerable care must be taken with the character of the precipitant and its control to avoid excessive calcium contamination. For this reason where comparatively pure products are desired it has been necessary to use relatively pure lime or dolomite and to subject a slurry of this material to purification treatment, as for example screening and classification (see Chesny 2,089,339) before it is reacted with the brine. Also it has been customary to carefully avoid "overliming" because this results in increased lime contamination of the final products.

It is an object of the present invention to provide a process of the above character which will avoid the use of the above described conventional methods for the removal of both solid phase and soluble impurities, and which will eliminate such impurities by less expensive methods.

A further object of the invention is to provide a new process for manufacture of magnesium products from brines, which will make it possible to use relatively impure precipitant materials without contaminating the final product with solid phase impurities.

Another object of the invention is to provide a process which will have a relatively low fresh water consumption.

Additional objects of the invention will appear from the following description in which the preferred embodiment has been set forth in detail in conjuction with the accompanying drawing.

Referring to the drawings:

Figure 2 is a diagrammatic view showing suitable apparatus for carrying out the carbonating operation.

Figure 3 is a diagrammatic view showing suitable apparatus for carrying out the aerating operation.

Figure 1:
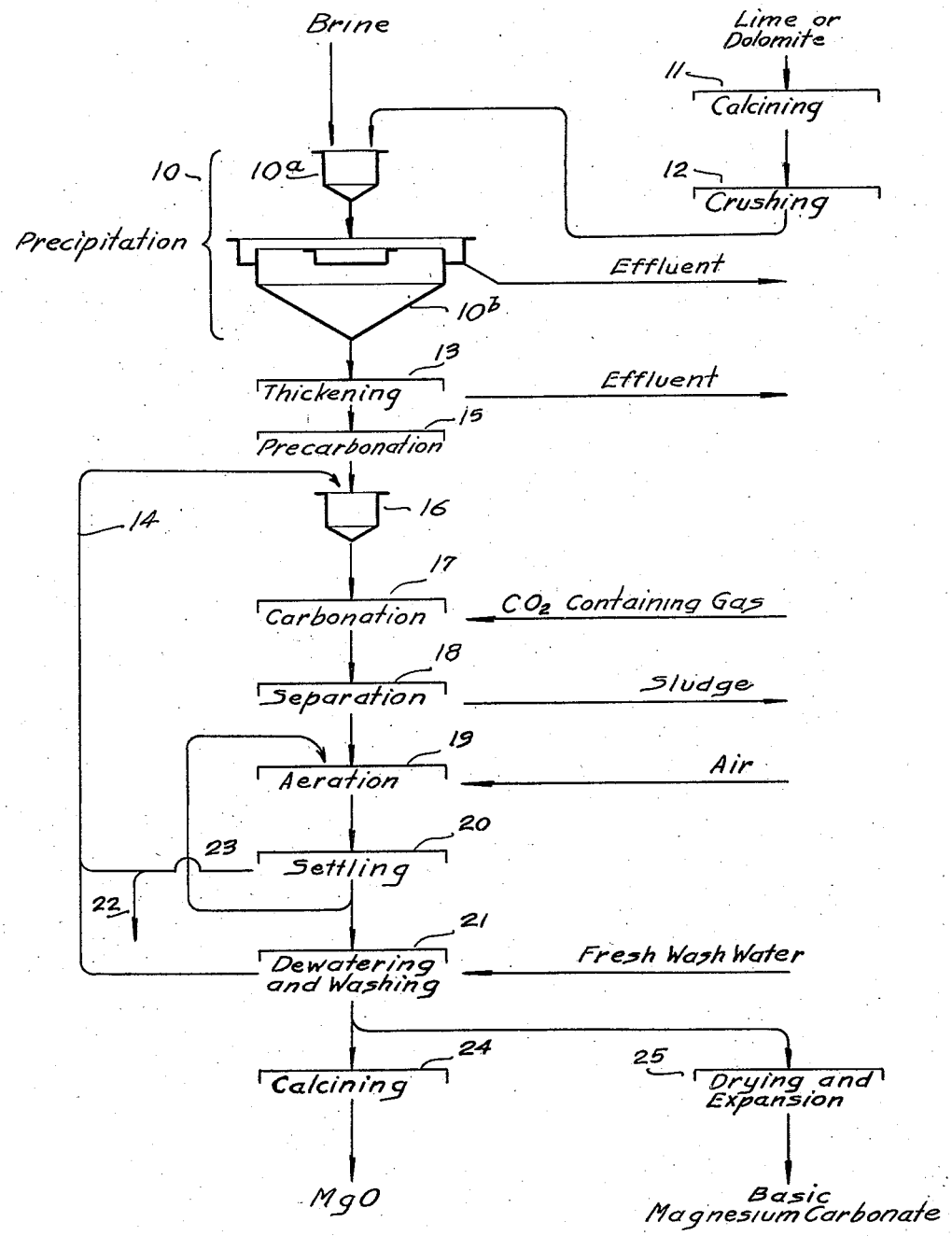
Figure 1 is a flow sheet illustrating one manner of carrying out the present process.

The process illustrated in Fig. 1 is particularly applicable to the manufacture of magnesium products from sea water. Thus sea water is shown being supplied directly to the precipitating operation 10. Pretreatment can be omitted in entirety, or applied only to the extent of chlorination and settling out of readily removable solids. In the precipitating operation the brine is reacted with the precipitating material, such as lime or dolomite, which has been prepared by calcining 11, followed by crushing 12. While it is possible to make up a slurry of this calcined material which in turn is contacted with the brine, I prefer to take the dry powdered calcined material and intermix it directly with the sea water, after which the reaction is permitted to proceed to completion and the precipitated magnesium hydroxide is permitted to settle to the lower portion of the tank. For example as indicated in the drawing the dry calcined lime or dolomite in powdered form is fed at a controlled rate to the mixing vessel 10a, where it is intermixed with the incoming brine solution. The mixture is then passed to the tank 10b, where the reaction is completed and the precipitate permitted to settle out from the effluent or mother liquor.

The relatively dilute slurry withdrawn from the precipitating tank is then passed to a thickening operation 13, to produce a thickened magnesium hydroxide slurry for further treatment. In a typical instance the dilute slurry withdrawn from the precipitating tank 10b can contain from 1.1 to 1.3% magnesium hydroxide solids, and the thickened slurry can contain from 15 to 25% magnesium hydroxide solids.

The thickened slurry from 13 contains a certain amount of calcium, one part of which is in dissolved form, mainly as calcium chloride and calcium sulphate, which are formed by the reaction of lime with the magnesium chloride and magnesium sulphate of the sea water. Another part of the calcium present is in solid phase, as for example unreacted calcium oxide or hydroxide remaining from the precipitant. For reasons to be presently explained in greater detail it is desirable to eliminate such dissolved calcium salts prior to contacting the slurry with the major part of the magnesium bicarbonate solution returned back from a later stage by way of line 14. Thus the slurry is subjected to a precarbonation step 15 which is carried out while the slurry is at an elevated temperature of from 70 to 90° C. Hot flue gas can be passed through the slurry as indicated whereby the slurry is heated and the dissolved calcium salts converted to solid phase calcium carbonate. In general substantially all of the dissolved calcium salts are carbonated to calcium carbonate in this precarbonation step, but the magnesium hydroxide is left substantially uncarbonated. The reaction involved in carbonating calcium chloride and calcium sulphate results in conversion of a minor percentage of magnesium hydroxide to magnesium chloride and magnesium sulphate.

As an alternative to the use of flue gas for precarbonation a small proportion of the bicarbonate solution from line 14 can be diverted and mixed with the slurry, while the slurry is heated to from 70 to 90° C. The reaction in this instance is substantially the same in that available calcium present is converted to calcium carbonate, and some magnesium chloride and magnesium sulphate is formed.

Following precarbonation at 15 the slurry is shown being diluted at 16 with the effluent 14, which as will be presently explained contains soluble impurities together with some unconverted magnesium bicarbonate. After such dilution the slurry containing say from 1 to 1.7% Mg(OH)$_2$ is treated in the main carbonating operation 17.

The carbonating operation 17 can be carried out by various methods, but I prefer to use the method which will be presently explained in connection with Fig. 2. In general during carbonation the slurry is contacted with a carbon dioxide containing gas, such as flue gas, whereby the magnesium hydroxide content is converted to magnesium bicarbonate in solution. Upon completing this carbonating operation the entire mass of material undergoing treatment is supplied to the separating operation 18, where sludge solids are removed as indicated, while the effluent passes to the aerating operation 19. The sludge solids removed at 18 include all of the solid impurities of the brine and of the precipitant, and in general will include solid phase calcium carbonate, silica, and possibly some organic material. The effluent from which the sludge is removed contains all of the magnesium bicarbonate, dissolved magnesium salts formed during precarbonation, dissolved impurities such as sodium chloride from the brine, and any dissolved impurities which have been added to the process by way of the lime or dolomite precipitant. In the aerating operation 19 the effluent is intimately contacted with a relatively neutral gas, such as air, preferably by a procedure such as will be presently explained. Aeration serves to remove a certain amount of carbon dioxide from the solution by diffusion, with the result that a substantial part of the magnesium bicarbonate is converted to solid phase neutral magnesium carbonate.

Following aeration the material is treated by settling 20, to produce a thickened slurry of neutral magnesium carbonate which is then passed to the further dewatering and washing operation 21. Operation 21 can be carried out with various known types of equipment, such as filters, or basket type centrifuges.

The effluent from settling operation 20, and also from operation 21, contains the soluble impurities previously mentioned, including dissolved impurities from the original brine, from the lime or dolomite precipitant, and dissolved magnesium salts formed during precarbonation, together with some residual unconverted magnesium bicarbonate. The major part of this effluent is shown being returned by line 14 to the mixing operation 16. A minor part is shown being bled off from the system by line 22, in order to maintain the salt concentration in the cycle within the desired range.

For reasons to be presently explained it is desirable to return a certain proportion of the settled solids from operation 20, back to the aerating operation 19. (Line 23.) Such a return is advantageous for several reasons, including economy in air consumption, elimination of scale formation, and the production of a relatively fast settling neutral magnesium carbonate. After dewatering and washing at 21, the now relatively pure neutral magnesium carbonate is in condition for treatment to produce any number of magnesium compounds. For example it is shown being subjected to calcining 24 to produce a relatively pure magnesium oxide. It is also shown being subjected to drying and expansion at 25 to produce basic magnesium carbonate. Expansion can be carried out by heating the material, during the later drying stages, to temperatures of the order of from 250 to 400° F.

In carrying out the above process it is desirable in most instances to produce a relatively crystalline and fast settling precipitate of magnesium hydroxide. Direct introduction of powdered precipitant into the brine forms a precipitate having a much faster settling rate than one produced by use of a hydrous slurry of the precipitant, and as previously pointed out this is made possible in the present process because of the manner in which both insoluble and soluble impurities from the precipitant are disposed of in the process. To further increase the settling rate of the precipitate, small amounts of a suitable coagulant, such as boiled starch, can be added to the tank 10b. Another method to further increase the settling rate is to produce a sintered precipitant in the manner disclosed and claimed in co-pending application Serial No. 397,072, filed June 7, 1941, in the names of Clarke and Gloss, now Patent No. 2,356,395, dated August 22, 1944. As disclosed in said co-pending application the lime or dolomite, after being calcined and crushed, is intermixed with a small amount of a sintering agent, particularly a fluoride like calcium fluoride, after which the mixture is subjected to a sintering temperature of the order of from 700 to 1100° C. By treating the precipitating material in this fashion the magnesium hydroxide can be precipitated with a settling rate substantially twice as fast as the precipitating material in unsintered condition and used in powdered form. When such a sintered material is employed it introduces another solid phase impurity into the process, namely calcium fluoride, which is removed from the process together with the other solid impurities in the separating operation 18.

Fig. 2 shows suitable equipment for carrying out the carbonating operation. In this case three tanks, 36, 37 and 38 are employed, of progressively increasing height. Each tank is equipped with a lower perforated plate or baffle 39, and carbon dioxide containing gas is introduced into the space below these plates, from the supply line 41. The gas can be ordinary kiln gas containing from 20 to 35% carbon dioxide. Lines 42 and 43 indicate successive flow of material (by pump or by gravity) from tank 36 to 37, and from thence to the last tank 38. Material is removed from regions immediately above the perforated plate 39. Line 44 delivers the material to the separating means. Each tank is also shown provided with intermediate perforated baffles or plates 46, which serve to break up the interior of each tank into a plurality of successive treatment zones, and which permit downward progression of both solution and solids without remixture between the zones. The last tank 38 is made relatively high in order to afford a substantial pressure during the last part of the carbonating operation. For example where the last tank is about 45 feet high, the pressure in the lower portion of this tank is of the order of 20 lbs. per square inch, and final carbonation at this pressure makes possible a substantial increase in bicarbonate concentration. With the arrangement of different sized tanks illustrated, flue gas can be supplied to the tanks at pressures in accordance with the tank height, with the highest pressure gas being reserved for the last treatment stage. At temperatures of the order of from 15 to 25° C. such equipment can produce solutions ranging from 2.5 to 3.5% magnesium bicarbonate.

As a supplement to the equipment described in Fig. 2, it is possible to use one or more additional stages of pressure carbonation. In this event the concentration of solids in the slurry entering the carbonating operation is such as to provide sufficient magnesium oxide to produce a final bicarbonate concentration of the order of from 3.5 to 5%. These concentrations are obtained if flue gas containing about 30% carbon dioxide is employed at pressures of the order of from 50 to 75 lbs. per square inch. With application of pressure carbonation as described, the higher bicarbonate concentration obtained makes it possible to greatly increase the capacity of an existing plant. Another manner of increasing the concentration of the bicarbonate solution is to supply the last stage, as for example the tank 38, with a gas having a relatively high carbon dioxide content, as for example in the neighborhood of from 80 to 95%.

Fig. 3 shows a desirable arrangement of equipment for carrying out the aerating operation. Tanks 51, 52 and 53 are shown, with each tank having a perforated bottom plate 54, and intermediate perforated baffles 56. Line 57 serves to introduce air under pressure into the lower end of each tank. Line 58 represents removal of material from the lower portion of tank 51, at a point immediately above plate 54 for transfer by pump or gravity flow to tank 52, and line 57 similarly shows transfer from the lower part of tank 52 to tank 53. Line 61 indicates removal of material from the lower portion of tank 53 to the hydraulic thickener 62. This thickener corresponds to the thickening or settling operation 20 in Fig. 1. The thickened slurry withdrawn as the underflow 63, is shown being returned in part to the first tank 51 by way of line 64. The remainder passes on for further treatment as previously described. The proportionate amount of slurry returned in this fashion is dependent upon the concentration of the magnesium bicarbonate solution. For example with a 2.5% magnesium bicarbonate solution, which one can obtain by the process shown in Fig. 1 operating upon sea water, and with a carbonating procedure as shown in Fig. 2, good results are obtained by returning solid phase carbonate in such amounts to tank 51 that there will be from 6 to 10% neutral magnesium carbonate present in the first carbonating stage.

As pointed out in my copending application Ser. No. 457,643, filed September 8, 1942, now Patent No. 2,390,095, dated December 4, 1945, return of neutral carbonate solids as described above serves to increase the size of the neutral magnesium carbonate particles produced during aeration, thus producing a solid phase material having a relatively high settling rate. In addition it makes possible a substantial saving in the air employed for the deaerating operation, and it greatly alleviates or entirely avoids scale formation, which otherwise tends to be present, particularly in the first tank. The saving in air is due to the faster deposition of neutral carbonate on the large external surface provided by the recycled solids, with an accordingly shortened aeration time.

In carrying out aeration, air may either be blown into the lower end of the tanks under pressures equivalent to the height of the liquid columns and dispersed by suitable means, or suction may be applied to the top of the enclosed tanks instead and the air "inhaled" at the bottom of the tank. Although the latter procedure does not appreciably increase the rate of decarbonation, it results in slightly higher recoveries because of the lower solubility of magnesium carbonate in contact with air under reduced pressure. In some cases where hot air is available in the process, e. g. from the cooling of the calcines or parts of the calcining equipment, its use in the first stage of the aeration may be advantageous because the resulting slight temperature increase of the bicarbonate solution has a beneficial effect upon the efficiency of the aeration. Hot flue gases may also be used for this purpose. However, the temperature of the liquid should again be reduced in the second stage of the aeration by the use of air of normal temperatures; otherwise the increased temperature of the liquid cycle would result in lower bicarbonate solubilities during the carbonation.

The optimum amount of magnesium bicarbonate which is returned by way of line 14 to the process, to secure most economical operation, is somewhat dependent upon the concentration of the bicarbonate solution received from the carbonating operation. For example where the effluent received from the carbonating operation 17 contains about 2.5% of magnesium bicarbonate, I prefer to carry out aeration to the extent of converting only about 55 to 65% of the bicarbonate to neutral magnesium carbonate, and the remaining bicarbonate (containing from 35 to 45% of the total bicarbonate received for aeration) is returned by way of line 14 to the process, excepting that which is bled from the system at 22. Where the carbonating method employed is such that a higher bicarbonate concentration is obtained, as for example of the order of 4%, the actual amount of bicarbonate returned is the same as before but represents only 15 to 20% of the total bicarbonate entering aeration 19.

By the aerating method shown in Fig. 3, using for example bicarbonate solution of the order of 2.5%, the amount of air employed for the aerating operation can be of the order of 4 cubic feet of free air per gallon of solution, if delivered at a pressure of about 8 lbs. per square inch. This amounts to about 100 cubic feet of air per pound of magnesium oxide produced. During aeration there is no violent agitation of the bicarbonate solution, such as would require large quantities of air, but only a very gentle agitation such as is occasioned by upward movement of small bubbles of air through the solution.

In Fig. 3 tank 51 has been shown closed in order to permit removal of gas escaping from the surface of the liquid. This gas consists of air together with a substantial percentage of carbon dioxide. It can be advantageously reused in the process, as for example in the first carbonating tank 36. Tanks 52 and 53 can be similarly enclosed and the removed gases employed in the same manner.

While aeration by passing air or like gas through the bicarbonate solution is preferred, it is possible to employ other methods of aeration, such as spraying the solution in contact with air. In such event aeration would be carried out in stages with each stage incorporating sufficient storage of solution for settling out of solids formed. For example it is possible to employ a series of settling tanks, each provided with pumping means for recirculating solution through spray nozzles, and with the overflow from one tank passing to the next tank of the series. The spray nozzles would discharge above the body of liquid in each tank for intimate contact with air.

The proportionate amount of effluent bled from the process at 22, can vary in accordance with operating conditions. In general however an amount should be bled off at this point which is at least equal to the amount of liquid entering the cycle with the thickened magnesium hydroxide from operation 13. In a typical instance this can be as little as about 6 to 10% of the total circulating liquid.

In the foregoing reference has been made to precarbonation 15 before mixing the bulk of the returned magnesium bicarbonate solution with the impure magnesium hydroxide slurry. If precarbonation is omitted the soluble calcium salts (i. e. magnesium chloride and magnesium sulphate) are present in concentrations depending upon the character of the brine and the extent to which such salts may be removed by thickening followed by dilution. I have discovered that when such a slurry is diluted with magnesium bicarbonate solution and subjected to carbonation 17, substantially all of the dissolved calcium salts are converted into a super-saturated solution of calcium bicarbonate. Contrary to what might be expected such calcium bicarbonate does not break down into solid phase calcium carbonate, but remains in a state of supersaturation throughout carbonation. This is attributed to the stabilizing effect of other salts present. In the aerating operation 19 such calcium bicarbonate is decomposed to form solid phase calcium carbonate, which then contaminates the magnesium carbonate obtained by aeration. Thus without precarbonation one may have for example a calcium content of from 3 to 8% (CaO basis) in the final magnesium oxide, depending upon the available magnesium content of the sea water, and the precipitating, settling, thickening, and dilution practices employed. With precarbonation dissolved calcium salts are eliminated and as a result practically no calcium bicarbonate is formed in the main carbonating operation. Thus using sea water with precarbonation the calcium content (CaO basis) of the final magnesium oxide is reduced to values of the order of from 0.5 to 0.9%, with use of relatively impure grades of lime or dolomite as precipitants.

From the above it is apparent that my process is capable of producing relatively pure magnesium compounds from brines like sea water, and that both solid phase and soluble impurities from both the brine and the precipitating material, are eliminated in simple and inexpensive operations. The final washing of the neutral magnesium carbonate ($MgCO_3 \cdot 3H_2O$) to remove dissolved impurities is made comparatively simple and easy because this material forms coarse and fast settling crystals, and can be treated without difficulty by filtration or centrifuging. A relatively small amount of wash water is required for this material compared to washing of magnesium hydroxide in prior processes. For example my process can be carried out by use of about 1.2 gallons of fresh water per pound of magnesium oxide produced, in contrast with use of from 6 to 15 gallons of fresh water per second of magnesium oxide for prior processes.

When brines other than sea water are employed, it is evident that one may be required to make adjustments and alterations, to take care of the particular constituents present. Where brines contain concentrations of convertible magnesium salts considerably greater than in sea water, the thickening operation 13 can be simplified, or may be omitted in entirety and a slurry of proper concentration with respect to magnesium hydroxide content can be withdrawn directly from the precipitating tank 10b.

When the process is applied to certain concentrated inland brines, the precipitate may tend to form in part as a double salt, as described in the aforesaid Chesny et al. Patent 2,041,047. Assuming that a brine of the type referred to in said Patent 2,041,047 is employed, double salt formation can be avoided by heating the brine to an elevated temperature of the order of 60° C., for the precipitating operation. However in the present process heating of the brine can be omitted. Such double salts when formed do not interfere with the process because they readily carbonate at 17 to form magnesium bicarbonate.

Previous reference has been made to the fact that the present process eliminates both solid phase and soluble impurities from the precipitating material. This makes it possible to utilize a wide variety of inexpensive materials without interfering with the purity of the magnesium compounds made. For example I can make use of materials like relatively impure limestones, oyster shell, or impure dolomitic materials, having impurities such as would inhibit their use in conventional processes for production of high grade magnesium compounds. Where dolomitic materials are employed, it is to be understood that the calcium content of the dolomite constitutes the precipitant for reacting with the brine. The magnesium content of the dolomite appears in the slurry from tank 10b as magnesium hydroxide or unhydrated magnesium oxide. It is carbonated together with the magnesium hydroxide obtained by precipitation.

I claim:

1. In a process for the manufacture of magnesium compounds from brines containing convertible magnesium salts together with solid phase and dissolved impurities, the steps of reacting the impure brine with a lime containing material to form a magnesium hydroxide precipitate together with dissolved calcium salts, removing a portion of the mother liquor to form a slurry for further treatment, precarbonating the slurry at a temperature of the order of from 70 to 90° C. to eliminate dissolved calcium salts present, diluting the slurry, subjecting the slurry to carbonation to convert magnesium hydroxide to magnesium bicarbonate, removing the magnesium bicarbonate solution from remaining sludge solids, converting a substantial part of the bicarbonate to solid phase magnesium carbonate, removing the solid phase carbonate from remaining effluent, and using such effluent as the diluent in the diluting step.

2. In a process for the manufacture of magnesium compounds from sea water, the steps of reacting the impure sea water with an impure lime containing material to precipitate magnesium hydroxide, the reaction being accompanied by formation of calcium chloride and calcium sulphate, obtaining from the reaction step a slurry containing the precipitate together with a portion of the mother liquor and solid phase impurities from the sea water, carbonating the slurry to a degree sufficient to convert dissolved calcium salts present to solid phase calcium carbonate, diluting the slurry, subjecting the slurry to further carbonation to convert the magnesium hydroxide to magnesium bicarbonate, removing the magnesium bicarbonate solution from remaining sludge solids, converting a substantial part of the magnesium bicarbonate to solid phase neutral magnesium carbonate and removing the solid phase neutral magnesium carbonate from remaining effluent.

3. In a process for the manufacture of magnesium compounds from a brine containing magnesium chloride and magnesium sulphate together with solid phase and dissolved impurities, the steps of reacting the impure brine with a lime containing material to convert the magnesium chloride and magnesium sulphate to a magnesium hydroxide precipitate, said reaction being accompanied by formation of calcium chloride and calcium sulphate, removing a portion of the mother liquor to form a slurry of the precipitate for further treatment, precarbonating the slurry to convert calcium chloride and calcium sulphate to solid phase calcium carbonate, diluting the slurry, subjecting the slurry to further carbonation to convert magnesium hydroxide to magnesium bicarbonate, removing the magnesium bicarbonate solution from remaining sludge solids, converting a substantial part of the magnesium bicarbonate to solid phase neutral magnesium carbonate, removing the solid phase carbonate from remaining effluent, and utilizing said effluent as diluent in the aforesaid diluting step.

4. In a process for the manufacture of magnesium compounds from a brine containing convertible magnesium salts together with solid phase and dissolved impurities, the steps of reacting the impure brine with a lime containing material to convert the magesium salts to a magnesium hydroxide precipitate, said reaction being accompanied by formation of dissolved calcium salts, obtaining from the reaction step a slurry containing a precipitate together with a portion of the mother liquor and solid phase impurities from the brine, carbonating the slurry to a degree sufficient to convert the dissolved calcium salts present to solid phase calcium carbonate, subjecting the material to further carbonation to convert the magnesium hydroxide to magnesium bicarbonate, and then removing the magnesium bicarbonate solution from the remaining sludge solids.

GUNTER H. GLOSS.

REFERENCES CITED

The following references are of record in the file of this patent:

UNITED STATES PATENTS

| Number | Name | Date |
| --- | --- | --- |
| 734,030 | Young | July 21, 1903 |
| 935,418 | Sisson | Sept. 28, 1909 |
| 1,101,772 | Young | June 30, 1914 |
| 1,505,202 | Judd | Aug. 19, 1924 |
| 1,927,602 | Crowell et al. | Sept. 19, 1933 |
| 2,089,339 | Chesny | Aug. 10, 1937 |
| 2,209,444 | De Beeze | July 30, 1940 |
| 2,209,752 | Abrahams et al. | July 30, 1940 |
| 2,276,245 | Clarke | Mar. 10, 1942 |
| 2,281,477 | Chesny | Apr. 28, 1942 |
| 2,348,898 | Greider et al. | May 16, 1944 |